H. H. WELCH.
POWER INDICATOR FOR VEHICLES.
APPLICATION FILED FEB. 9, 1914.
1,240,273.
Patented Sept. 18, 1917.
4 SHEETS—SHEET 1.
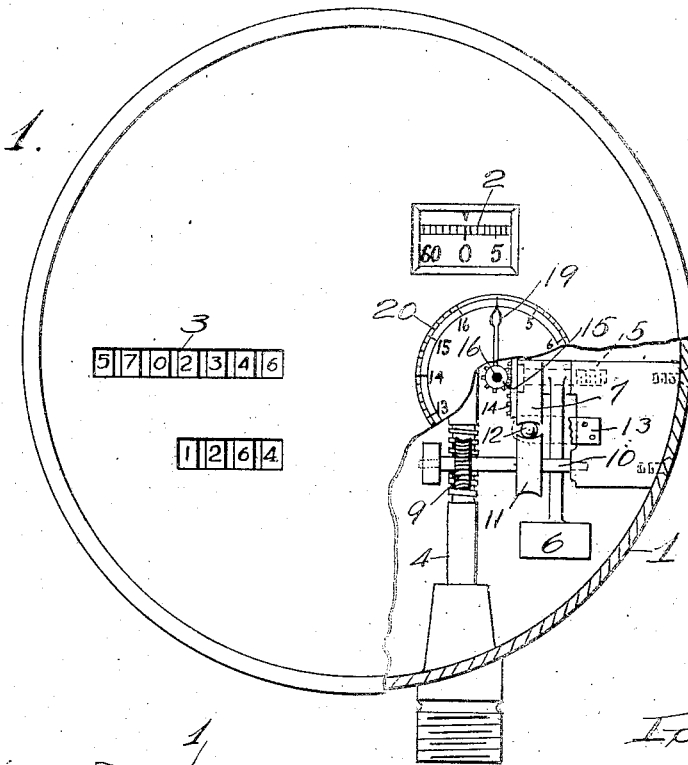
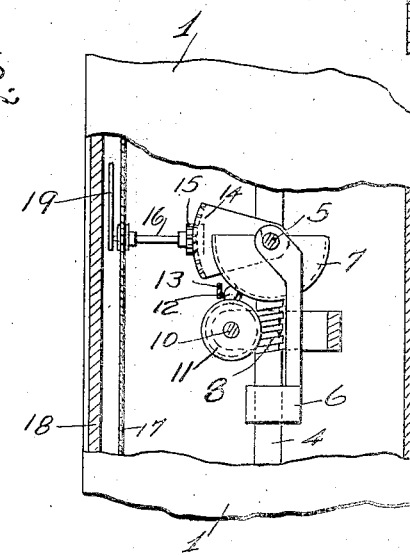
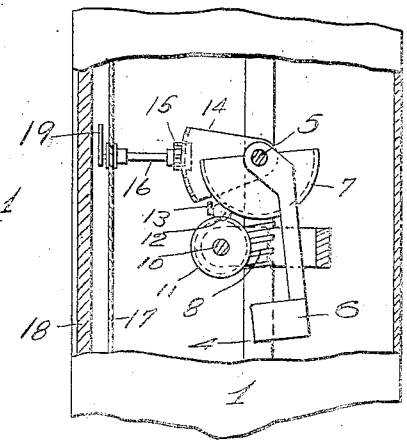
Inventor
Horace H. Welch.
by Burton & Burton
his attys H. H. WELCH.
POWER INDICATOR FOR VEHICLES.
APPLICATION FILED FEB. 9, 1914.
1,240,273.
Patented Sept. 18, 1917.
4 SHEETS—SHEET 2.
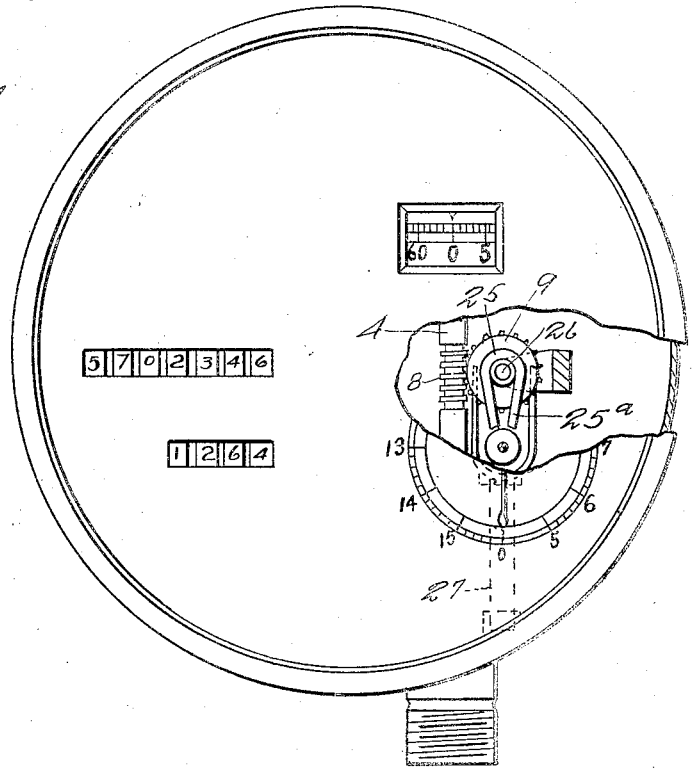
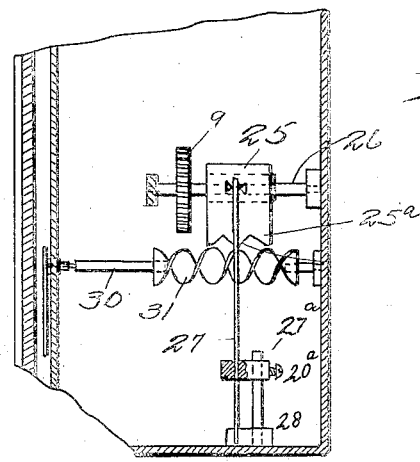

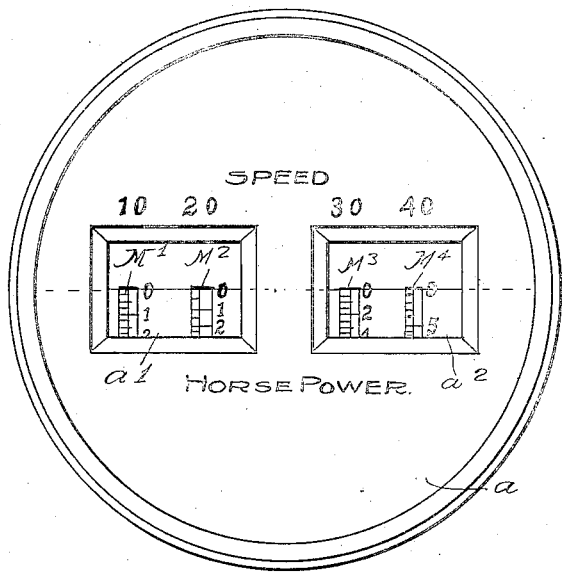
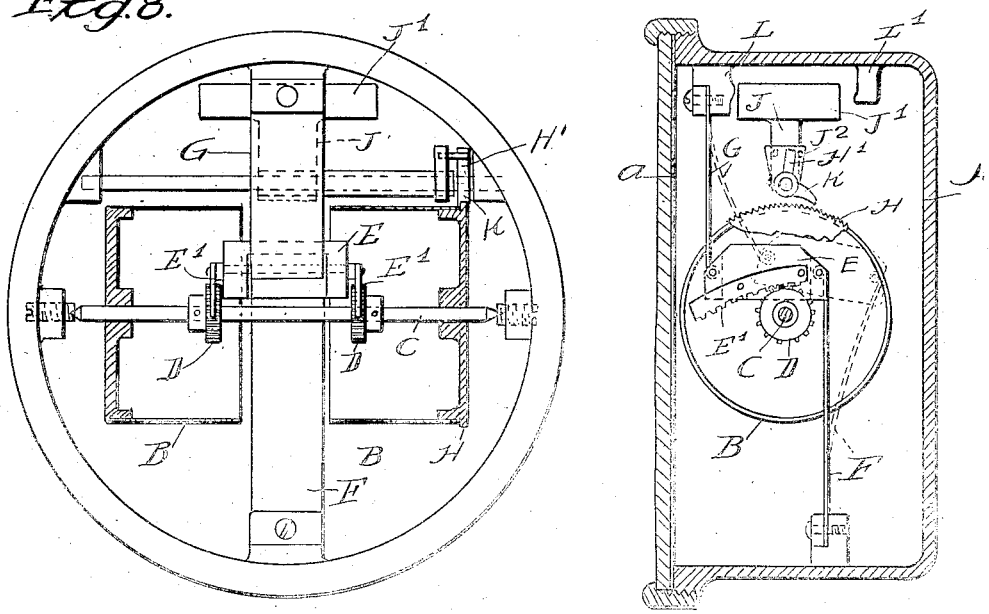

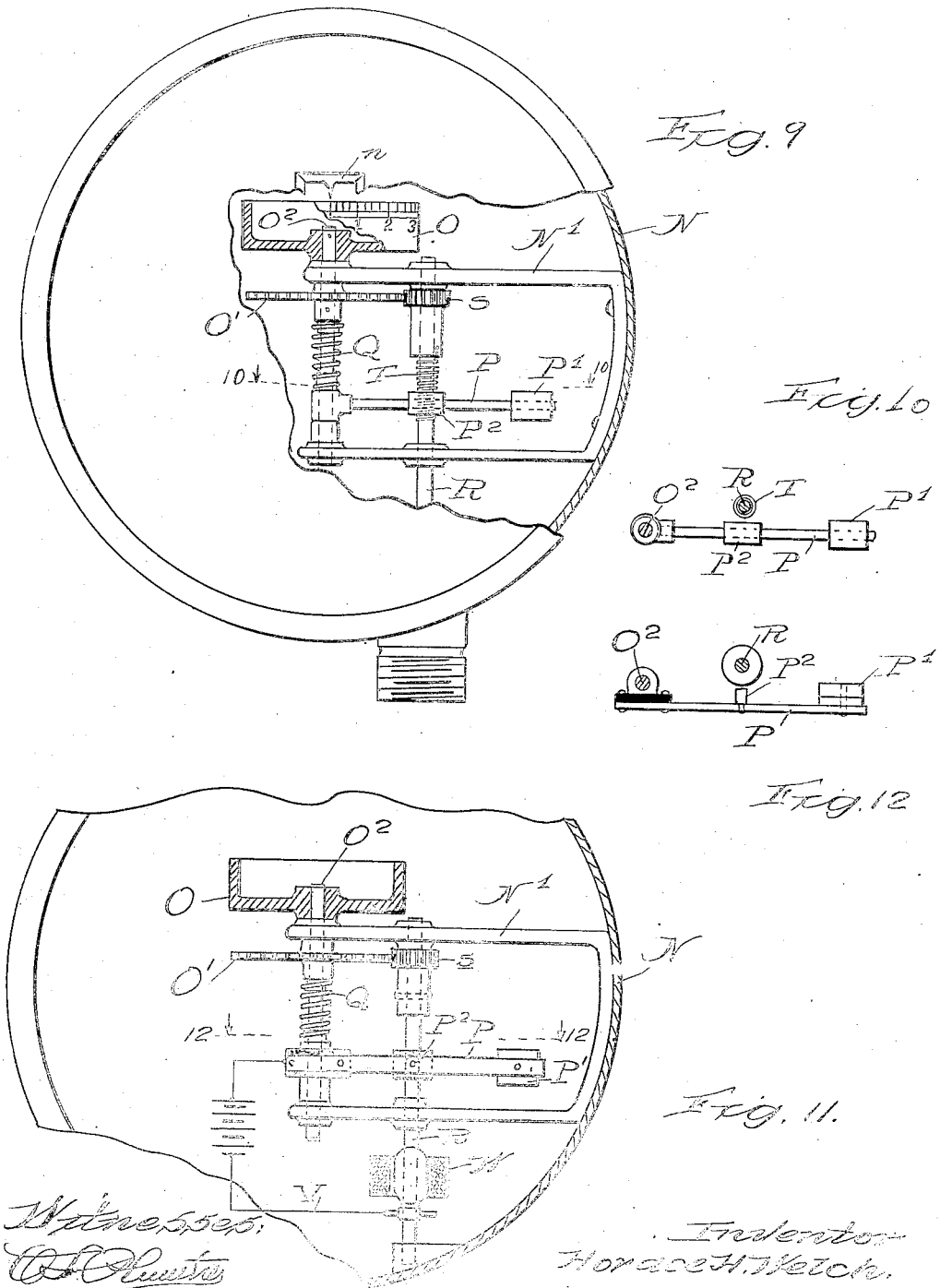

UNITED STATES PATENT OFFICE.

HORACE H. WELCH, OF CHICAGO, ILLINOIS.

POWER-INDICATOR FOR VEHICLES.

1,240,273.  Specification of Letters Patent.  Patented Sept. 18, 1917.

Application filed February 9, 1914. Serial No. 817,660.

*To all whom it may concern:*

Be it known that I, HORACE H. WELCH, a citizen of the United States, residing at Chicago, in the county of Cook and State of Illinois, have invented new and useful Improvements in Power-Indicator for Vehicles, of which the following is a specification, reference being had to the accompanying drawings, forming a part thereof.

The purpose of this invention is primarily to provide an improved means by which the horse power consumed in running a vehicle on the road may be indicated. It consists in the elements and features of construction shown and described as indicated in the claims. In the drawings, there are shown two forms of the invention.

Figure 1 is a front or face elevation of a travel indicator (speedometer or odometer) equipped with the devices constituting this invention, the front of the casing being broken away to disclose these devices, the parts being shown in position of rest.

Fig. 2 is an edge elevation of the same with the casing broken away to disclose the parts constituting the invention.

Fig. 3 is a view similar to Fig. 2, showing the parts in the position occupied when indicating horse-power consumption in travel.

Fig. 4 is a view similar to Fig. 1, showing a modified form of the invention.

Fig. 5 is a view similar to Fig. 2 of the form shown in Fig. 4.

Fig. 6 is a face elevation of an instrument embodying another modification of the invention.

Fig. 7 is a vertical fore-and-aft medial section of the same.

Fig. 8 is a section at the line 8—8 on Fig. 7.

Fig. 9 is a front elevation with the front plate partly broken away showing another modification.

Fig. 10 is a section at the line 10—10 on Fig. 9.

Fig. 11 is a partly sectional front elevation of an instrument showing a further modification with the front plate removed and certain parts shown in section at a plane axial with respect to the rotating indicator element.

Fig. 12 is a detail section at the line 12—12 on Fig. 11.

For the best efficiency of the devices shown in both forms, these devices are associated with a shaft which is continuously rotated by means entirely independent of the movement of the parts constituting the device for the indication which they are to give. Most conveniently, these devices are associated with a travel indicator (either speedometer or odometer or both), the main shaft of which is rotated by the travel of the vehicle and meets the conditions stated. In the form shown in Figs. 1, 2 and 3, 1 is the speedometer and odometer casing, as indicated by the speed indicating scale, 2, and the mileage scale 3, showing at the face of the instrument. 4 is the main shaft of the instrument rotated in any familiar way by connection with a wheel or shaft of the vehicle. For the purposes of this invention, there is provided a shaft, 5, having journal bearings supported in the case for positioning said shaft horizontally, and, most conveniently for compactness in certain respects, with its axis in a line intersecting the axis of the main shaft 4. Upon the shaft, 5, there is mounted a pendulum or depending weight, 6, adapted to swing away from said shaft forwardly with respect to the direction of travel of the vehicle. Rigid with the pendant weight, 6, there is a semi-circular disk, 7. The shaft, 4, is provided with a worm, 8, which engages a worm gear, 9, on a shaft, 10, suitably journaled in the case, and rigid with said worm gear there is a disk, 11, preferably in the plane of the semi-circular disk, 7. Both said disks have their peripheries concaved, and at the nearest point of approach they are separated by a distance a little less than the diameter of a ball, 12, which is checked by a fixed finger, 13, against escape from its lodgment in the grooves of the two disks, as seen in Fig. 2. Rigid with the semi-circular disk, 7, and pendulum, 6, there is a crown-gear segment, 14, which meshes with a pinion, 15, on the indicator staff, 16, journaled in the casing and protruding through the front plate, 17, thereof, so as to carry behind the protecting glass, 18, an indicator hand, 19. On the forward face of the front plate, 17, there are graduations about the axis of the staff constituting a dial, 20, whose graduations are in power units, preferably, in most cases, units of horse power.

Considering this mechanism when the instrument containing it is mounted with the shaft, 4, normally vertical when the vehicle stands at rest on a level track, it will be seen that, disregarding entirely the effect of the clutch ball, 13, upon the pendulum action of the weight, 6, if, when the vehicle is being driven forward, the motor driving it is disengaged by throwing out the clutch, the power which has been required to develop the speed against all the resistances, and which will be measured by the effect of these resistances in slowing down the vehicle, is a function of the speed, the weight of the vehicle and the rate of diminution of the speed. The scale, 20, being calibrated for a given speed and given weight of vehicle, the indications become a direct function of the total resistance to travel, these resistances to travel being made up of the friction of the vehicle mechanism in itself, of the wheels on the ground or track, and of the air resistance. If the speed selected for calibrating the scale is comparatively low, the air resistance in still air or a slight wind may be regarded as a constant, or when the indication is taken in considerable wind, it may be taken going first one way and then the other, the average reading being used. A comparison of the reading with the standard horse power required to drive the vehicle at the selected speed, which the makers of the vehicle are always prepared to state, will indicate whether the vehicle is in all respects in proper order, or whether it is at some part operating with a greater than normal friction.

An indication taken in the manner described,—that is, with the clutch thrown out,—will afford no clue as to the condition of the motor. In order to ascertain whether the motor is in proper working order, or is, on the contrary, working against embarrassments, the reading may be taken in the same manner as above described, except that, instead of throwing out the clutch, the spark will be cut out, if it is an internal combustion motor, or cutting off the steam or the battery, if it is a steam or electric motor, so that the motor as well as the car will be driven by the acquired momentum of the car. This indication being compared with the indication obtained by throwing out the clutch, will give the total power absorbed by the motor, which, being compared with the horse power absorbed by the motor in proper condition at the selected speed, will show its relative condition in respect to internal resistance or friction.

In the absence of any provision to the contrary, the pendant weight, 6, would tend to oscillate back and forth and make it impracticable to obtain an accurate reading. The purpose of the connection which includes the clutch ball, 13, is to make the instrument "dead beat." If the disk, 11, were at rest, it will be seen that the initial forward movement of the weight, 6, would cause the clutch ball, 13, to lock the disk, 7, and thereby prevent the swinging of the weight and any indication which might be derived therefrom. The disk, 11, in whose periphery the ball rests, it will be observed is revolved by the shaft, 4, in direction to roll the ball away from the periphery of the semi-circular disk, 7; and thereby, when the vehicle is moving so that the shaft, 4, is revolving and the disk, 11, is revolved as stated, the clutch action of the ball is prevented or released, and if the rotation of the disk, 11, is quite slow, the release being correspondingly slow, the clutch ball acts as a damper upon the pendant weight and prevents it from responding to mere jolts or instantaneous impulses which cease before the clutch ball releases the disk; the result is that the index needle, 19, is practically dead beat.

It will be observed that independently of acceleration or retardment of the vehicle,—that is, when running at uniform speed, if the vehicle is ascending or descending a grade, the swing of the weight, 6, from its normal position on level track will be indicated, and as to angle multiplied in the angular movement of the indicator needle, 19. By providing on the plate, 17, a second graduated scale, 20, concentric about the axis of the staff, 16, with its graduations in degrees or per cent. of grade, the device becomes a perfect grade meter, the dead beat feature above described operating effectively to render the grade indication reliable and free from inaccuracies due to mere jolts. It will be understood, however, that in order to make the grade indication true, it must be taken when the vehicle is traveling at uniform speed, since otherwise the acceleration or retardment will give the indicator needle a movement in addition to that which is caused by the grade.

As a power meter, the device is not affected by the gradient of the road on which the reading is taken. If, for example, the clutch is thrown out when the vehicle is on a down grade just steep enough to maintain the selected speed, the power furnished by gravity being exactly that which on a level would be furnished by the motor, that power will be directly related to the grade and the index needle will stand at the position to indicate at the same instant both the grade and the horse power required to drive the vehicle on a level road at the selected speed. If the down grade is less than sufficient to maintain the selected speed by gravity, the retardment or negative acceleration will operate to swing the weight, 6, farther forward than it would be swung by the grade alone, and the needle will indicate precisely the same horse power as before, but will swing beyond the point proper to indicate the grade. On the other hand, if the reading is taken when the vehicle is on an upgrade the retardment being correspondingly more rapid, the weight will receive a stronger forward impulse than at the same speed on level or down-grade, but it will not swing farther from normal position, because the up-grade will operate to carry it backward. The power indication will therefore be exactly the same in all three cases, but only in one of them,—viz. when the gradient is just sufficient to maintain the speed,—will the grade be correctly indicated at the same time as the power.

In the form shown in Figs. 4 and 5, the weight from which the indication is derived is mounted for sliding on a shaft, 26, which is preferably horizontal when the vehicle stands on level track with freedom to slide backward and forward on the shaft against the resistance of a spring 27, which is flexed one way or the other by the movement of the weight one way or the other, and which incidentally prevents the weight from rotating with the shaft, 26. The static friction of the weight thus sliding on the shaft which would prevent its starting in either direction against the resistance of the spring until the impulse for starting it became considerable, is practically eliminated by mounting the shaft, 26, for rotation, preferably quite slowly, by the main shaft, 4, of the speedometer, such rotation being caused by a worm, 8, on the shaft, 4, engaging the worm gear, 9, on the shaft, 26. With this provision, the negative acceleration caused by throwing out the clutch in cutting off the power, causing the vehicle to move only under its own momentum, operates to start the weight forward substantially as if it were held without friction and to carry it forward against the resistance of the spring, 27, a distance corresponding to the strength of the impulse. The weight, 25, is preferably a horseshoe magnet having its poles broad and notched, providing a plurality of projecting points or poles, 25$^a$, which travel in a path parallel to an indicator staff, 30, which comprises at the portion opposite the path of the magnet a flat soft iron strip or ribbon, 31, spirally twisted to an extent which makes the distance from turn to turn equal to the distance between the points or poles 25$^a$, of the magnet. At the normal position of rest these points or poles,—which, as illustrated, are six,—three upon each end of the horseshoe magnet alined two and two transversely of the shaft, 26,—stand opposite three successive turns of the spirally twisted ribbon, as seen in Fig. 4, so that the said ribbon is held by attraction of the magnet at three points without contact therewith. When, now, the magnet is caused to slide on its shaft, the attraction of the poles for the spirally twisted strip of the shaft causes the edge of the latter to follow and substantially keep up with the magnet points, maintaining the spiral edge constantly adjacent to the edge of the magnet poles or points; and, since the staff, 30, cannot move longitudinally, it is compelled to rotate in order to present the spiral edge constantly to the magnet poles moving longitudinally of said staff. By this means, the sliding of the magnet produces rotation of the index staff and of its index hand, 32, which is positioned with respect to the graduated power scale precisely as in the other form.

This form is adapted also to serve as the grade indicator, because it will be seen that when the vehicle is traveling up grade, the weight, 25, will tend to slide one way on the shaft, and when moving down grade it will slide the other way, rotating the index staff and hand through an angle corresponding perfectly to the angle of inclination of the shaft, 26.

In order to provide for adjusting the instrument to vehicles of different weights without reconstruction in the form shown in Figs. 4 and 5, the spring, 27, is made adjustable as to its operative length by means of a check or bridle, 27$^a$, mounted on a fixed finger, 28, for movement along the length of the spring from the secured end of the latter, and adapted to be secured by a set screw 20$^a$, on the finger, 28, at any position to which it may be adjusted. The heavier the vehicle, the shorter the operative length of the spring should be made, and the finger, 28, may be graduated in units of vehicle-weight. Two or three different sizes of springs may be provided, adapted, respectively, to operate with vehicles ranging between certain limits, and adapted to be adjusted in the manner described to any point within those limits; thus, one spring may be adapted to vehicles weighing from 1000 to 2000 pounds; another, 2000 to 3000 pounds; another, from 3000 to 4000 pounds, and another, from 4000 to 5000 pounds, and each may be adjusted by means of the bridle with any desired degree of nicety to the exact weight of the vehicle to which the instrument is attached. In the form shown in Figs. 1, 2 and 3, a similar result is accomplished by making the weight, 6, adjustable on the arm, 6$^a$, by which it is suspended from its pivot shaft, 5.

In Figs. 6, 7 and 8, there is shown a different form of embodiment of this invention. In this form there is mounted within a casing, A, drums, B, B, both on the same shaft, C, carrying a plurality of scales graduated for different speeds, as hereinafter explained, each scale being exposed for reading through an aperture in the casing four scales being shown and two apertures, $a^1$ and $a^2$, being provided in the face plate, a, of the casing for reading them, respectively. The drum is rotated by means of a pinion, D, on the shaft, C, said pinion being engaged by a segment rack, E¹, attached to a weight, E, which is carried by two spring arms, F and G, each being pivoted at one end to the opposite ends of the weight, and having the other end secured fixedly to the casing. These spring arms stand normally parallel with each other at the position of rest of the weight, which is a position at which the segment rack is engaged near the forward end with the pinion, the instrument being designed to be mounted with the face plate facing rearward and the weight mounted for reciprocating fore-and-aft in the direction of travel of the vehicle. On one end of one of the drums, there is secured a ratchet disk, H, and pivoted to the casing directly above the axis of the drum is a tumble-bob lever, J, having at its upper end a weight, J¹, adapted to oscillate between two stop lugs, L and L¹, on the casing. Upon the pivot of the tumble-bob lever there is also pivoted a pawl, K, whose tail, K¹, rests against a stop pin, J², on the tumble-bob lever, so that the pawl normally tends to rock about its pivot with the rocking of the tumble-bob lever. The pawl is adapted to be engaged with the ratchet disk, H, as a detent when the tumble-bob is rocked forward against the forward stop, L¹, and it is lifted out of engagement with the ratchet disk when the tumble-bob rocks back against the stop, L. The last-mentioned position is the normal position of the parts when the vehicle is at rest or in forward travel at absolutely uniform speed. At the normal position of the drum when the rack, E, is at the position shown in Fig. 7, the spring arms, G and F, being parallel and vertical, the graduated scales, M¹, M², M³ and M⁴, on the drum shut their zero marks at the openings, a¹, and a², respectively. Above the openings for the respective scales there is marked the speed at which they are to be read. For example, 10, 20, 30 and 40 miles per hour, as shown in the drawings. When the vehicle is running at the speed of 10 miles per hour, for example, the driving power being disconnected, the diminution of forward movement of the vehicle causing relative acceleration of the weight, E, with respect to the casing in which it is supported, will cause the weight, E, to move forward in the casing in the path controlled by the parallel spring arms, F and G, causing the rack, E¹, engaging the pinion, to rotate the drums. The same acceleration will cause the tumble-bob, J, to swing forward against the stop, L¹, carrying the pawl, K, down into engagement with the ratchet disk, H, and the tumble-bob weight being carried over the center of support will hold the pawl in that position, causing it by its engagement with the ratchet disk to detain the disk and the drums, at the position to which they are rotated by the forward movement of the weight, E, the distance to which they are moved against the resistance of the spring arms being in accordance with the acceleration; and the scale, 10, being calibrated for the actual weight of the vehicle, will indicate by the figure exposed at the reading aperture, a¹, the horse power necessary for driving the vehicle at 10 miles per hour. Similarly, when the vehicle is traveling at 20 miles per hour, the power being disconnected, the scale, M², will indicate at the aperture a², the horse power necessary to drive the vehicle at 20 miles per hour, and similarly, for the scales graduated at 30 miles and 40 miles, respectively.

Upon considering this device, it will be observed that the weight, E, will respond by movement to nothing but acceleration in the direction of travel. Neither up nor down jolts nor lateral jolts will give it any movement whatever, and the indication, therefore, which its movement produces will be free from errors due to such jolts.

In Figs. 9 and 10, there is shown a different embodiment of this invention.

In this form, there is mounted in the casing, N, preferably in a suitable rigid frame, N¹, an indicator drum, O, which is graduated on its outer face in power units, which may be read through an opening, n, in the case as the drum rotates to carry the scale figures past the opening. Rigid with the drum, O, for rotating it is a gear wheel, O¹, which is mounted for rotation upon a shaft, O², upon which there is also mounted for swinging about it a lever arm, P, which carries at its extremity a weight, P¹, which, by reason of such mounting is adapted to swing in a horizontal plane fore-and-aft in the line of travel of the vehicle. A spring, Q, coiled about the axis of the spindle, O², is connected at one end with the hub of the lever arm, P, and at the other end with the hub of the gear, O¹, the spring being coiled in such direction that the swinging of the arm, P, forward in the line of travel increases the tension of the spring and the rotation of the gear in the direction to turn the indicator drum, O, past the opening, n, in the direction in which it is graduated from lower to higher reading, also tends to tighten the spring,—that is, increase its resistance to the forward swinging of the arm. In the frame, N¹, there is journaled a shaft, R, which is rotated by any means independent of the swinging of the arm, P, or the rotation of the indicator drum, and this may be the shaft of a speedometer or odometer whose casing forms the casing for the mechanism described. Loose on the shaft, R, is a pinion, S, which meshes with the gear, O¹. Connected with the hub of the pinion, S, is a spring, T, preferably of flat wire or tape coiled about the shaft, R, and normally loose on the shaft, but with its coil so close thereto that very slight lateral movement will bring the coils into contact with the shaft, and cause the shaft when rotating in the direction of the coil to wind them up and cause them to operate as a clutch gripping the shaft and causing the shaft to rotate the pinion, S. The lever arm, P, extends crosswise of said shaft, R, near thereto and carries a flat pad, $P^2$, which presses laterally against the coils of the flat coiled spring, T. The several parts are so connected that when the zero part of the indicator, O, is exposed at the opening, $n$, the pad, $P^2$, is immediately adjacent to the coils of the spring, T, but not pressing the same against the shaft, R. Upon any forward movement of the weight, $P^1$, pressing the pad, $P^2$, against the spring, T, the said spring will be coiled tight upon the shaft and clutch the pinion, S, thereto, causing the latter to rotate, and by rotating the gear, $O^1$, to tighten the spring, Q, increasing its resistance to the forward movement of the lever arm, P, and weight, $P^1$, and tending to retract the pad, $P^2$, from the spring. It results that when the gear, $O^2$, has been rotated enough to tighten the spring, $O^2$, to a tension sufficient to overcome the forward impulse acting upon the weight, $P^1$, to press the pad, $P^2$, against the spring, T, the lever arm, P, will be retracted and the pad withdrawn from the spring, which will immediately relax its grasp upon the shaft and cause the rotation of the pinion, S, and gear, $O^2$, to cease. The extent to which the gear, $O^2$, is rotated before the tension of the spring, Q, becomes sufficient to overcome the forward impulse of the weight, $P^1$, becomes a measure of the force of that impulse; and the extent to which the gear, $O^1$, thus rotates before the pad is retracted from the spring, T, being shown by the figure on the graduated indicator member which is by that rotation brought to the opening, $n$, the reading thus obtained when the drum is graduated in power units and calibrated for a given weight and speed of vehicle, will indicate the power required to drive the vehicle at the selected speed. The drum may have a plurality of parallel graduations for different speeds, and the casing having its opening, $n$, extended across these several parallel graduations may be marked at the margin of the opening opposite the several graduations with the speed for which they are respectively calibrated. The spring, Q, will be adapted to the weight of the particular vehicle, a different spring being substituted for each different weight of vehicle to which the instrument is applied.

In Figs. 11 and 12, there is shown a still different embodiment of the invention. This form is identical with that last described, except that the shaft, R, is the shaft of an electric motor, W, which is energized in an electric circuit comprising a contact piece, $p^2$, carried by the arm, P, in lieu of the clutch-operating pad, $P^2$, of the preceding form. And instead of the pinion, S, loose on the shaft, there is a pinion, $s$, which is fast on the shaft. The circuit, V, is closed by contact of the contact piece $p^2$, with the shaft, R. In this construction, the parts being so connected that when the zero mark of the indicator drum is exposed at the opening, $n$, the contact piece, $p^2$, is just out of contact with the shaft, R, and the motor, therefore, at rest. It will be seen that upon any forward impulse being communicated to the weight, $P^1$, the contact piece, $p^2$, being brought against the shaft and closing the circuit will cause the motor upon being energized to rotate the gear, $O^1$, and tighten the spring, Q, with the effect of retracting or tending to retract the contact piece, $p^2$, from the shaft, R, causing the circuit to be broken and the motor to be deënergized and come to rest after having rotated the gear, $O^1$, enough to increase the tension of the spring, Q, until it overcomes the forward impulse upon the weight, $P^1$, the extent to which the indicator drum is rotated in thus tightening the spring being the measure of said forward impulse, and, the drum being graduated and calibrated as in the preceding form, the figure on the drum exposed at the opening, $n$, will indicate the horse power required to drive the vehicle at the selected speed.

I claim:—

1. A power indicator for vehicles, comprising a casing, a weight and means by which it is held yieldingly against back and forward movement relatively to the casing in the line of travel of the vehicle, said means being adapted to produce an accumulating resistance to such movement of the weight; an indicator element and a coöperating graduated scale element, one of said coöperating elements being mounted for movement with respect to the other, and means by which the movement of said weight controls the movement of the movable one of said coöperating elements, a rotary driving element, and connections by which it influences the rotation of the movable one of said coöperating elements, said connections being adapted for checking said movement of the weight.

2. A power indicator for vehicles comprising a casing, a weight and means by which it is held yieldingly against back and forward movement in the line of travel of the vehicle, said means being adapted to produce an accumulating resistance to such movement; an indicator element and a coöperating graduated scale element, one of said coöperating elements being mounted for movement with respect to the other; a rotary driving element and connections by which it rotates the movable one of said coöperating indicator elements adapted to cause accumulation of said yielding resistance to such movement; a source of energy for causing such rotation, and means by which the movement of the weight against such accumulating resistance connects said rotary driving element with said source of energy for rotation.

3. A power indicator for vehicles comprising a casing, a weight mounted for backward and forward movement in the line of travel of the vehicle; a spring which yieldingly resists such movement of the weight forward and tends to retract it; a rotary driving element; a rotary indicator element, and connections by which the former rotates the latter, means by which said rotation operates on the spring to increase its resistance to said movement of the weight; a source of energy for causing said rotation of the rotary driving element, and means by which the weight's movement connects said rotary driven element with said source of energy for rotation.

4. A power indicator for vehicles comprising in combination with a casing, a weight mounted for backward and forward movement in the line of travel of the vehicle, a spring which yieldingly resists such movement of the weight forward and tends to retract it; an indicator element mounted for rotation; a rotary driving element and connections by which it rotates said indicator element, connections by which the rotation of said indicator element operates on the spring to increase its resistance to said movement of the weight, an electric motor; connections by which the motor rotates said rotary driving element; a circuit in which the motor is energized comprising a contact-making-and-breaking part which is carried into circuit-closing position by said forward movement of the weight.

5. A power indicator for vehicles comprising, in combination with a casing, a weight mounted in the casing for movement backward and forward in the line of travel of the vehicle; a spring which yieldingly resists its forward movement and tends to retract it; a wheel mounted and connected with the spring for increasing its resistance when the wheel is rotated in one direction; a shaft and connections therefrom for so rotating the wheel; an electric motor for rotating the shaft; a circuit in which it is energized comprising a contact-making-and-breaking part which is carried into circuit closing position by said forward movement of the weight, and an indicator element rotated by said wheel.

6. A power indicator for vehicles comprising, in combination with a casing, a weight mounted for movement forward and backward in the line of travel of the vehicle; a spring which yieldingly resists its forward movement and tends to retract it; an indicator element mounted for movement; connections between said indicator element and the spring by which the movement of the former in one direction increases, and in the other direction diminishes the resistance of the spring to the weight's forward movement; an electric motor and driving connections by which it moves the indicator element in the direction for increasing the spring's resistance, and a circuit in which the motor is energized, comprising a circuit-making-and-breaking member which is carried into circuit-closing position by the forward movement of the weight.

In testimony whereof, I have hereunto set my hand at Chicago, Illinois, this 7th day of February, 1914.

HORACE H. WELCH.

Witnesses:
 ROBT. N. BURTON,
 LUCY I. STONE.